US009889531B2

(12) United States Patent
Agosti et al.

(10) Patent No.: US 9,889,531 B2
(45) Date of Patent: Feb. 13, 2018

(54) INTEGRATED WORKPIECE POSITIONING SYSTEM WITH INTEGRAL FUME EXTRACTION SYSTEM

(71) Applicant: LINCOLN GLOBAL, INC., Santa Fe Springs, CA (US)

(72) Inventors: Christopher Agosti, Mentor, OH (US); David Mate, Thompson, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 723 days.

(21) Appl. No.: 14/328,292

(22) Filed: Jul. 10, 2014

(65) Prior Publication Data

US 2015/0017898 A1 Jan. 15, 2015

Related U.S. Application Data

(60) Provisional application No. 61/845,267, filed on Jul. 11, 2013.

(51) Int. Cl.
*B08B 15/02* (2006.01)
*B23K 37/04* (2006.01)
(Continued)

(52) U.S. Cl.
CPC .......... *B23Q 11/0078* (2013.01); *B08B 15/00* (2013.01); *B23K 37/006* (2013.01);
(Continued)

(58) Field of Classification Search
CPC .. B23K 37/0461; B23K 37/08; B23K 37/006; B23K 37/047; B08B 15/00;
(Continued)

(56) References Cited

U.S. PATENT DOCUMENTS 5,143,356 A * 9/1992 Wittebrood ............. F27B 21/06
266/179
5,569,074 A * 10/1996 Gressel ................ B22D 31/002
108/142
(Continued)

FOREIGN PATENT DOCUMENTS

DE 19521110 A1 1/1996
DE 10334677 B3 11/2004
(Continued)

OTHER PUBLICATIONS

International Search Report and Written Opinion from PCT/IB2014/001317 dated Jan. 21, 2016; 10 pages.
(Continued)

*Primary Examiner* — Steven B McAllister
*Assistant Examiner* — Steven Anderson, II
(74) *Attorney, Agent, or Firm* — Perkins Coie LLP

(57) ABSTRACT

A workpiece positioning system integrated with a fume extraction device is provided. The system comprises a movable work surface assembly and a manifold. The work surface assembly includes a plurality of work surfaces and a plurality of ventilation ports. Each of the plurality of ventilation ports is disposed on each of the plurality of work surfaces to ventilate the corresponding work zone. The manifold is disposed below the work surface assembly and coupled to a duct system through which fumes produced during welding or cutting are to be transported to the fume extraction device. When a workpiece placed on a work surface is positioned for welding or cutting, the manifold is aligned and in fluid communication with the ventilation port corresponding to the work surface.

14 Claims, 9 Drawing Sheets

(51) Int. Cl.
*B23Q 11/00* (2006.01)
*B23K 37/00* (2006.01)
*B23K 37/047* (2006.01)
*B23K 37/08* (2006.01)
*B08B 15/00* (2006.01)
*B25H 1/20* (2006.01)
*B23Q 7/02* (2006.01)

(52) U.S. Cl.
CPC ........ *B23K 37/047* (2013.01); *B23K 37/0461* (2013.01); *B23K 37/08* (2013.01); *B23Q 7/02* (2013.01); *B25H 1/20* (2013.01)

(58) Field of Classification Search
CPC ... B08B 15/002; B08B 15/005; B08B 15/007; B08B 15/04; B08B 2215/006; B23Q 7/02; B23Q 11/0078; B25B 11/007; B25B 11/005; F24F 3/1607; B25H 1/20
See application file for complete search history.

(56) References Cited

U.S. PATENT DOCUMENTS

| | | | |
|---|---|---|---|
| 6,165,410 A | 12/2000 | Crees et al. | |
| 6,672,221 B2* | 1/2004 | Hadley | E04H 6/44 104/35 |
| 2003/0080096 A1* | 5/2003 | Yamaguchi | B23K 37/0461 219/121.39 |
| 2007/0107752 A1* | 5/2007 | Fuchigami | B08B 5/00 134/21 |
| 2008/0282500 A1* | 11/2008 | Omagari | B08B 5/02 15/415.1 |
| 2011/0108607 A1* | 5/2011 | Lipnevicius | B23K 37/047 228/45 |
| 2013/0244560 A1* | 9/2013 | Hammers | B08B 15/02 454/63 |

FOREIGN PATENT DOCUMENTS

| | | |
|---|---|---|
| EP | 0824992 A1 | 2/1998 |
| JP | 2003-164988 A | 6/2003 |
| JP | 2003164988 A | 6/2003 |

OTHER PUBLICATIONS

International Application No. PCT/IB2014/001317, International Search Report & Written Opinion, 13 pages, dated Jan. 12, 2015.

* cited by examiner

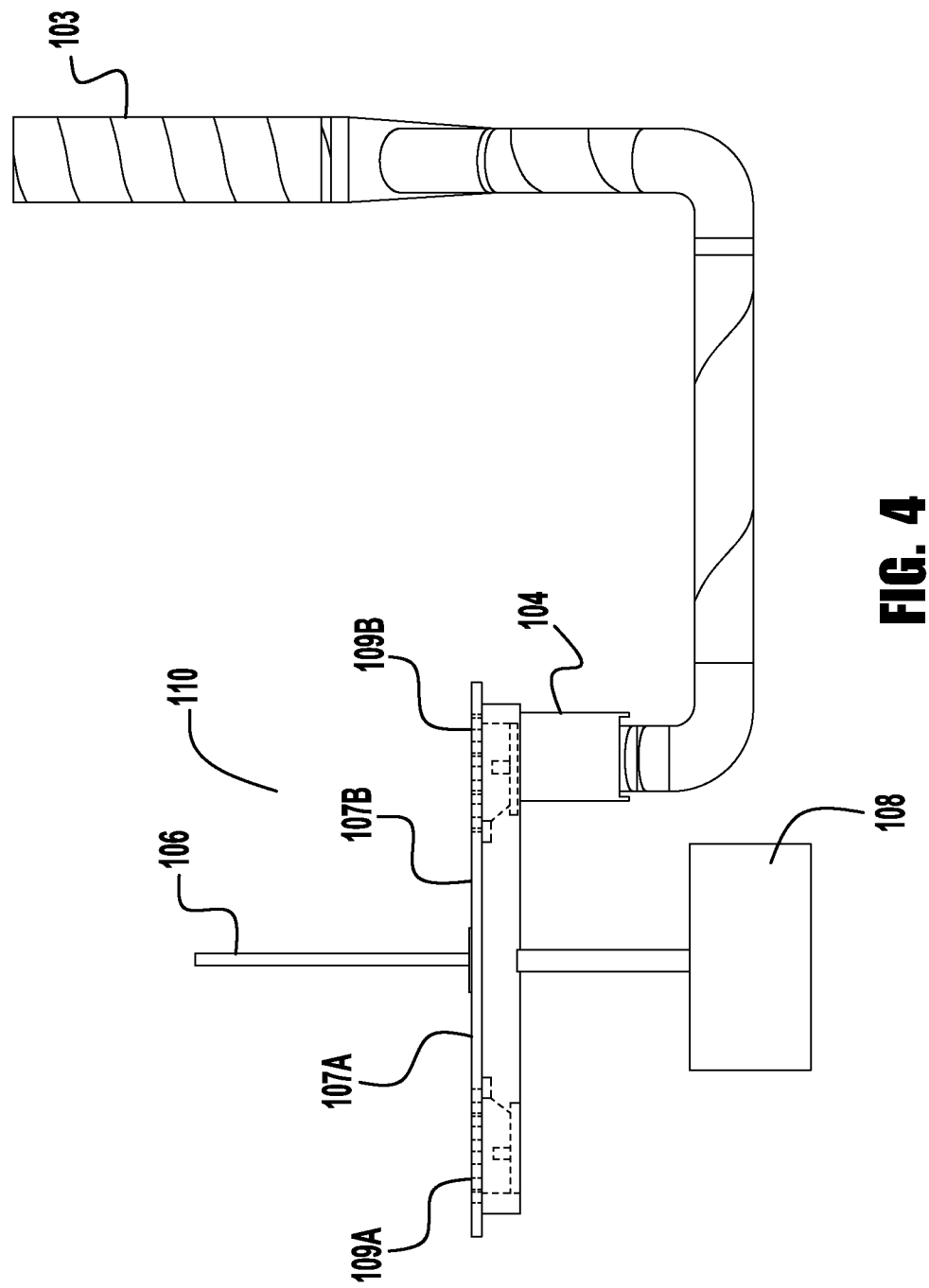

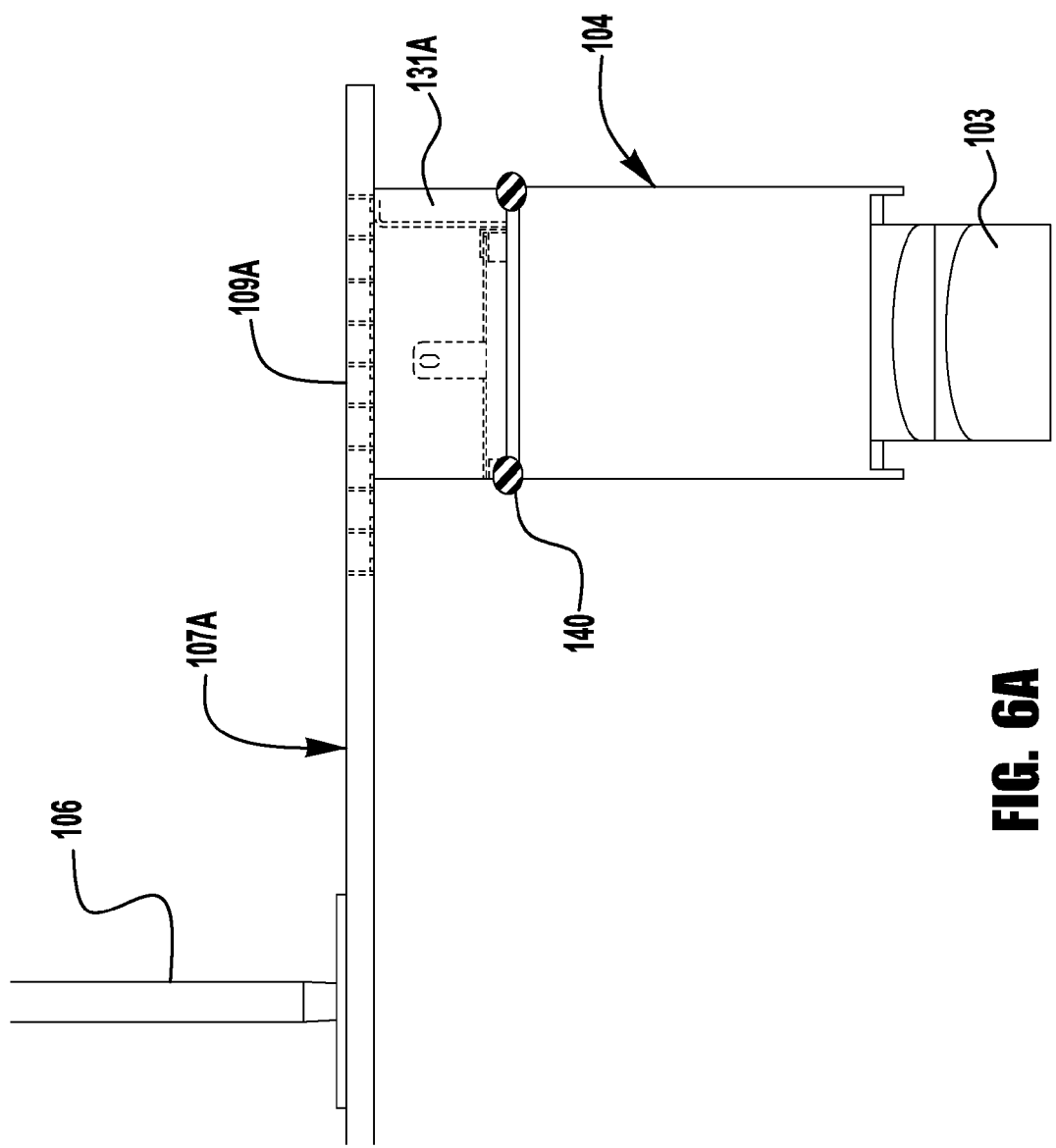

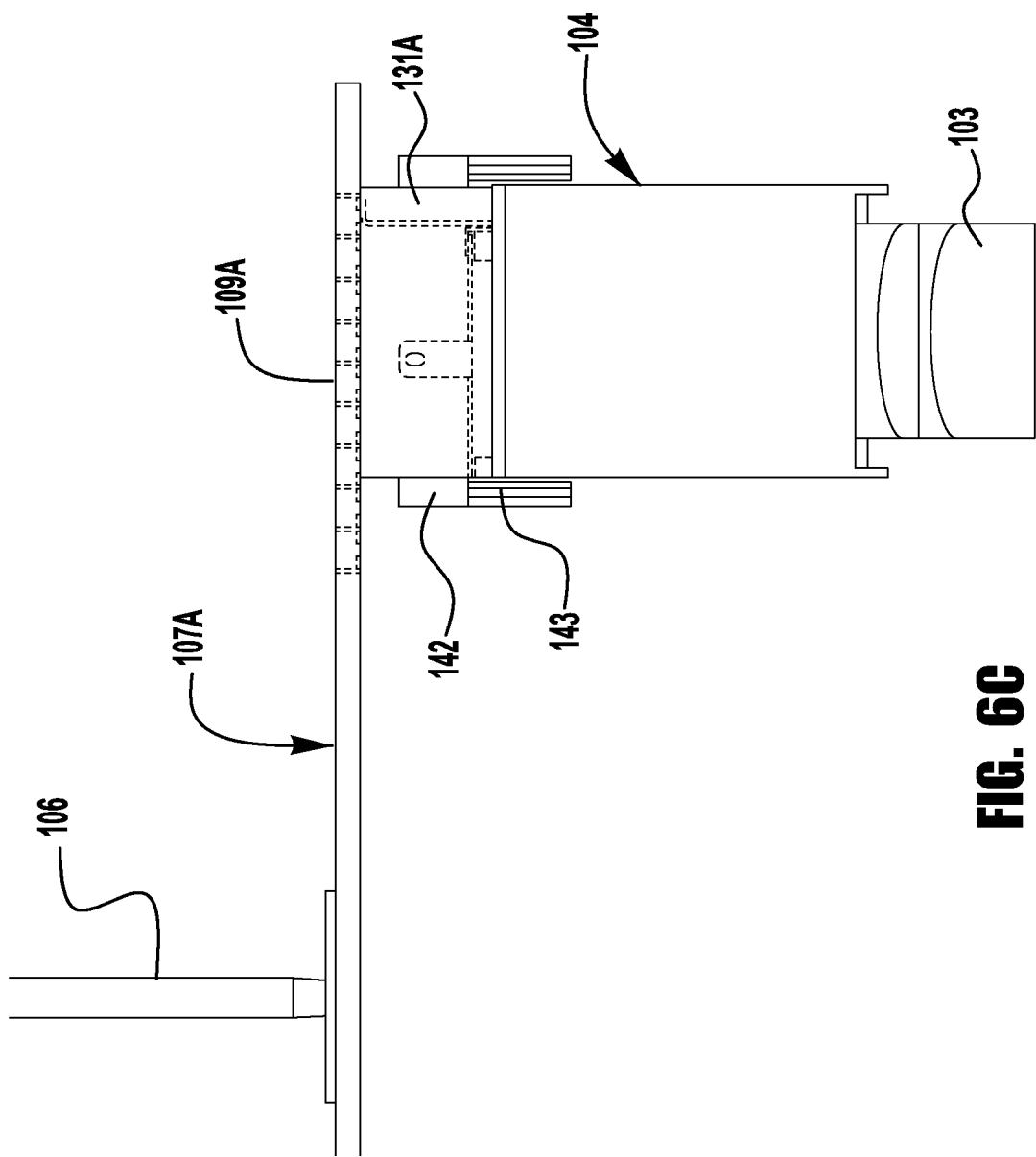

INTEGRATED WORKPIECE POSITIONING SYSTEM WITH INTEGRAL FUME EXTRACTION SYSTEM

PRIORITY

The present application claims priority to U.S. Provisional Patent Application No. 61/845,267, filed Jul. 11, 2013, which is incorporated herein by reference in its entirety.

TECHNICAL FIELD

Devices, systems, and methods consistent with the invention relate to welding and cutting, and more specifically to devices, systems and methods for welding and cutting using an integrated workpiece positioning system with integral fume extraction.

BACKGROUND

Because ventilation is desired during many welding operations, there have been advancements in ventilation/fume extraction systems, including those used with robotic and semi-automatic welding operations. However, these ventilation systems typically utilize stationary fume extraction systems where the extraction nozzle is fixed relative to a work surface. This fixed relationship can sometimes minimize the effectiveness of the ventilation systems as in many robotic and semi-automatic welding systems the workpieces are moved to different locations for different operations. Typically, when this occurs either the ventilation is compromised or multiple ventilation systems are required.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is an integrated workpiece positioning system with an integral fume extraction system. The positioning system includes a movable assembly that has a plurality of separate work zones, each capable of holding a workpiece, where each work zone has a work surface and a ventilation port. The ventilation ports in each work zone are positioned consistently so that the assembly can be moved or rotated to position each ventilation port over a stationary ventilation manifold or system so that ventilation can be provided for the workpiece during a cutting or welding operation. During operation the assembly is moved to position each respective ventilation port over the stationary ventilation system in a consistent and repeated fashion to allow for adequate work piece ventilation and increased productivity.

Another embodiment of the present invention is a workpiece positioning system that includes a movable work surface assembly having a plurality of work zones. The workpiece positioning system is, for example, integrated with a fume extraction device. The work surface assembly includes a plurality of work surfaces and a plurality of ventilation ports. Workpieces to be welded or cut are to be placed on the plurality of work surfaces. Each of the plurality of ventilation ports is disposed on each of the plurality of work surfaces to ventilate a corresponding work zone. In some exemplary embodiments, the workpiece positioning system further includes a manifold disposed below the work surface assembly. The manifold is preferably coupled to a duct system through which fumes produced during welding or cutting are to be transported to the fume extraction device. When a workpiece placed on a first work surface of the plurality of work surfaces is positioned for welding or cutting, the manifold is aligned and in fluid communication with a first ventilation port corresponding to the first work surface of the plurality of work surfaces.

BRIEF DESCRIPTION OF THE DRAWINGS

The above and/or other aspects of the invention will be more apparent by describing in detail exemplary embodiments of the invention with reference to the accompanying drawings, in which:

FIG. 4 illustrates a side view of the embodiment shown in FIG. 1;

FIGS. 6A to 6C illustrate exemplary embodiments of a seal engagement between a manifold and ventilation ports on the moveable assembly.

DETAILED DESCRIPTION

Figure 1:
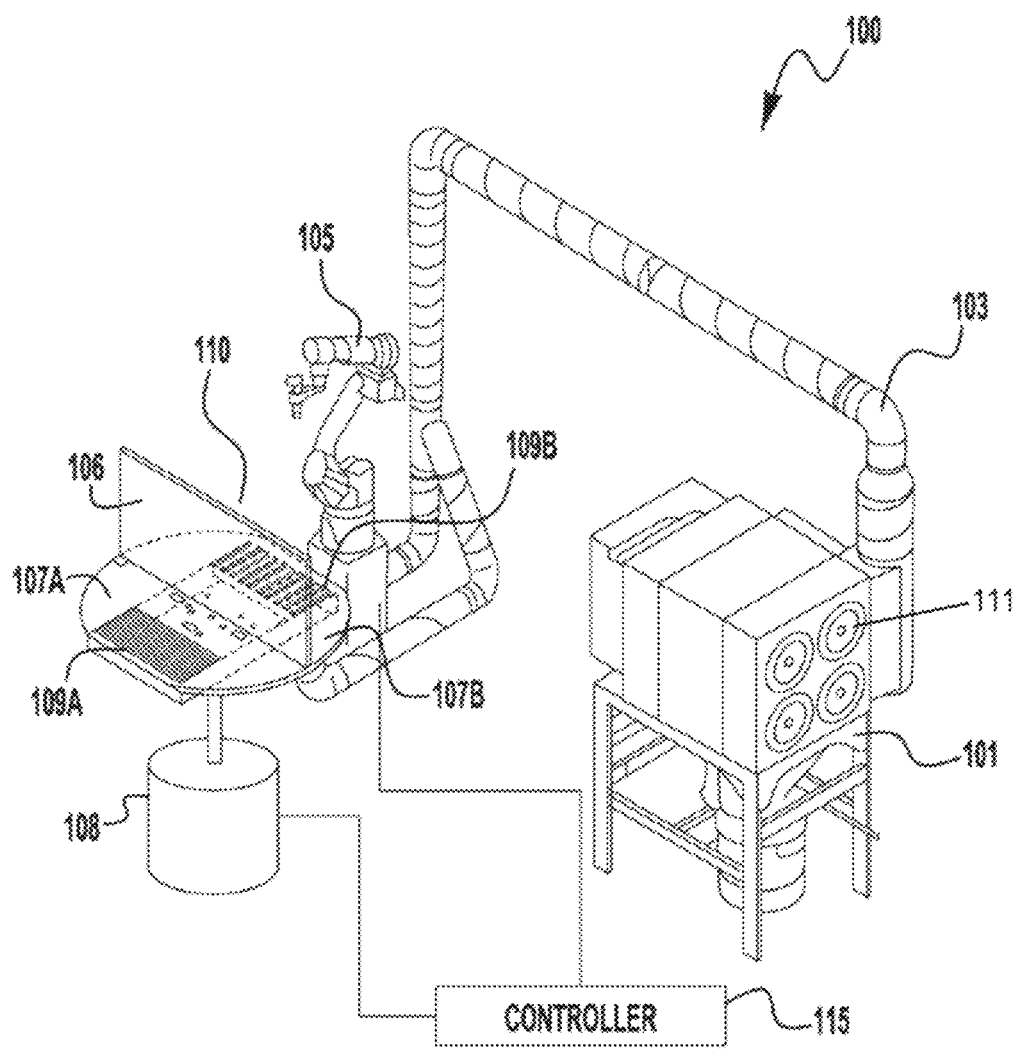
FIG. 1 illustrates an exemplary embodiment of an integrated fume extraction system in accordance with an exemplary embodiment of the present invention.
Figure 2:
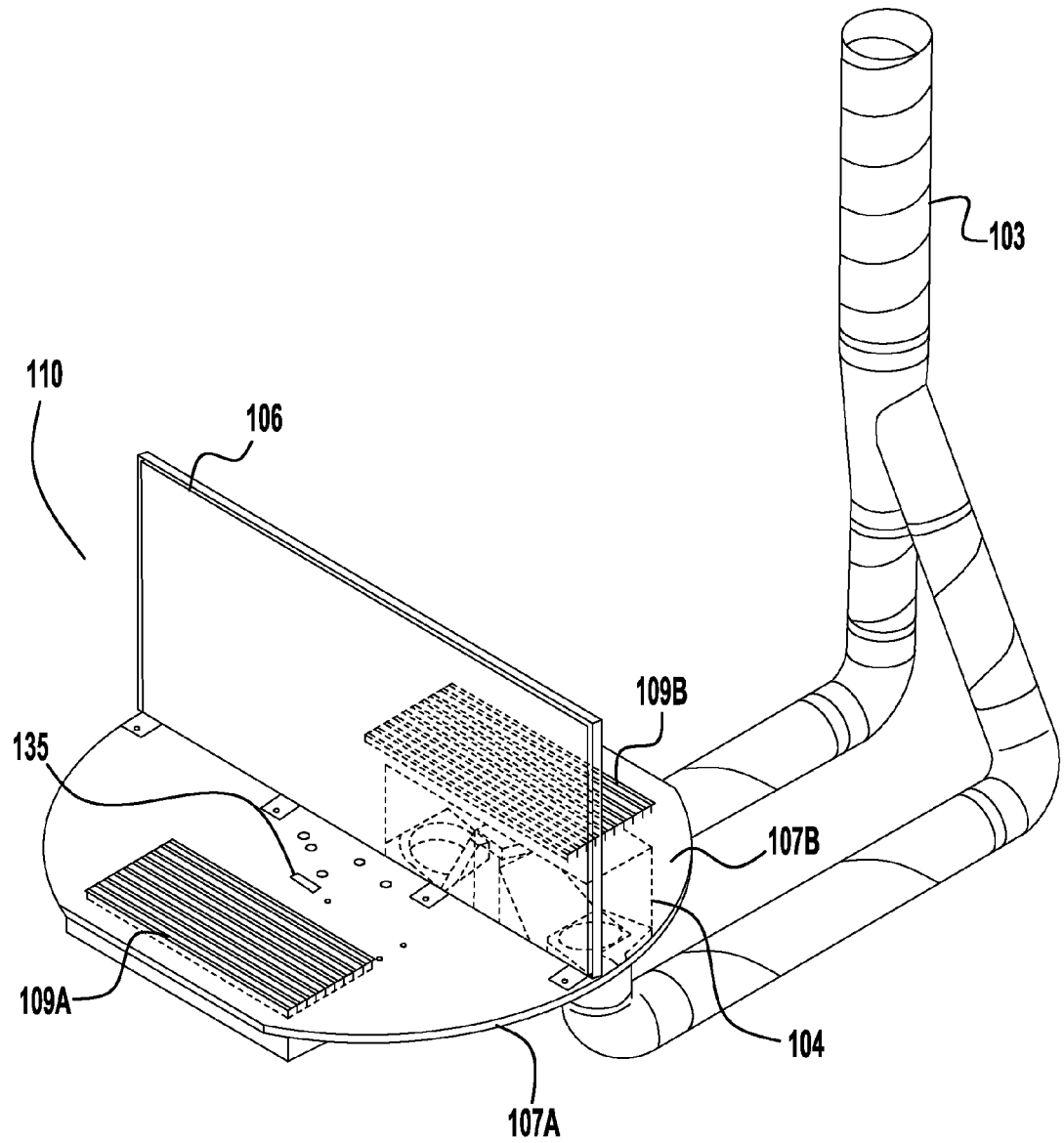
FIG. 2 illustrates a further view of the embodiment shown in FIG. 1.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIGS. 1-4 illustrate a diagrammatical representation of a system 100 in accordance with an exemplary embodiment of the present invention. The system 100 can be used in any robotic, semi-automatic or manual welding or cutting operation which utilizes a ventilation system. The system 100 utilizes a fume extraction device 101 which typically includes an extraction motor (not shown) and filters 111, where the motor draws air through a duct system 103 from the workpiece area during a welding or cutting operation. The filters are used to scrub the extracted air and remove any undesirable particulate and chemicals from the drawn air flow. The structure and operation of fume extraction devices 101 are generally known and as such their structure and operation will not be described in detail herein. The system 100 can also include a robot 105 to perform a desired welding or cutting operation. In other exemplary embodiments a semi-automatic or manual welding torch can be utilized without departing from the spirit or scope of the present invention.

As shown in FIGS. 1-4, the system 100 also includes a work surface assembly 110 upon which workpieces are placed to be welded or cut. The assembly 110 is a movable assembly such that it can position multiple workpieces in front of the robot 105 for a welding or cutting operation. In the embodiment depicted in the figures the assembly 110 is a rotatable assembly which pivots about a center point to position multiple workpieces in front of the robot 105. The assembly 110 is rotated by a motor 108. In an exemplary embodiment of the present invention, the motor 108 and the robot 105 are controlled by a controller 115 which controls the rotation of the assembly 110 and the movement of the robot 105. That is, the controller 115 causes the assembly 110 to rotatably move by an appropriate rotational distance to position a workpiece to be welded or cut by the robot 105.

The assembly 110 depicted is divided into multiple work zones (two shown) where the first work zone has a first work surface 107A and the second work zone has a second work surface 107B, each of which can support, separately, a workpiece for a welding or cutting operation. The work zones are separated by a center divider 106 which provides protection between the two work zones. The divider 106 shields each respective work zone to prevent debris from traveling from one zone to the other and to shield a user from the welding or cutting operation. In each of the respective work surfaces 107A/B is a ventilation port (see 109A and 109B, respectively). The ventilation ports 109A/B are oriented and positioned similar in each respective surface 107A/B so that when the assembly 110 is in an appropriate position one of the ports 109A/B is positioned over, and in fluid engagement with, a manifold 104 coupled to the duct system 103. This fluid engagement allows a downdraft ventilation effect to be achieved when the extraction device 101 is operating. That is, the fluid engagement relationship between the port 109A/B and the manifold 104 allows for efficient air flow down through the port 109A/B into the manifold 104 disposed below and proximate to the port 109A/B so that the air from the work zone can be ventilated adequately. Once a cutting or welding operation is completed on one side of the assembly 110, the assembly 110 is rotated 180 degrees so that the other of the work surfaces 107A/B and ports 109A/B is positioned in fluid engagement with the manifold 104 to allow for proper ventilation again, as described above. The ports 109A/B are positioned such that a geometric center of the ports 109A/B, respectively, are substantially aligned with a geometric center of the manifold 104 (at its upper opening) when each of the surfaces 107A/B is positioned in their respective work position. With such a configuration, the ventilation flow remains effective and consistent regardless of which work zone is being utilized. Further, in exemplary embodiments of the present invention the size and shape of the ports 109A/B are similar, in size and shape, to the upper opening of the manifold 104 at the assembly 110. In some exemplary embodiments the size of the ports 109A/B can be slightly larger than the opening of the manifold. However, the size and shape of the ports 109A/B can vary without departing from the spirit or scope of the invention, including shapes that are the same, larger, or smaller than the manifold 104.

It should be noted that each of the work surfaces 107A/B can have other holes, openings, ports, protrusions, etc. that aid a user in work piece positioning during use of the assembly 110. Specifically, the surfaces 107A/B can have one or more guides 135 that allow for a user to repeatedly place a work piece in the same position and orientation so that the robot 105 can consistently and properly perform a desired operation.

For example, during operation a user can place a first workpiece on the surface 107A, using the guides 135 on the surface 107A. In exemplary embodiments, the guides 135 would position the majority of the workpiece, or at least center the workpiece, over the port 109A. The assembly 110 is rotated 180 degrees by the motor 108, which is controlled by the controller 115 (the assembly can also be rotated by manual control), to position the workpiece in front of the robot 105 (or other type of welding or cutting apparatus). After rotation, the port 109A is aligned with, and in fluid engagement with (allowing for the flow of air through the port 109A and the manifold 104), the manifold 104 so that air from the work zone can be ventilated. Then either before, during, or after the robot 105 completes its operation the user can place a second workpiece on the other surface 107B of the second work zone. If the second workpiece is of the same kind as the first workpiece, the user may use the same guides 135, etc. on the surface 107B to position the workpiece properly. The divider 106 protects the user sufficiently that the user can stand on the opposite side of the robot 105 (or whatever device is being used) during operation without being harmed by the cutting or welding operation. When the welding or cutting operation on the first workpiece is completed and the second workpiece (to be worked on) is positioned, the assembly 110 is turned 180 degrees and the operation is conducted on the second workpiece as desired. The user can then remove the completed first workpiece and replace it with a third workpiece, and the process can be repeated as desired.

The controller 115/motor 108 can control the rotation/movement of the assembly 110 in an automated fashion, in which the motor 108 rotates after a set duration of time, or in a non-automated fashion, in which the motor 108 waits for a user input to initiate the movement/rotation operation.

In the depicted exemplary embodiment, the assembly 110 is symmetrical along a centerline (represented by the divider 106 in FIG. 1). That is, each of the surfaces 107A/B is substantially the same in size, dimensions, and orientation, and each of the ports 109A/B is substantially the same in size, dimensions, and orientation. This symmetry allows for consistent and repeatable work on workpieces as well as ensuring proper fluid engagement between the ports 109A/B and the manifold 104 in each work position. This ensures optimal ventilation flow in each work position of the assembly 110. It is noted that in some exemplary embodiments, the surfaces 107A/B need not be exactly the same as they can have different guides, protrusions, shape, etc. as desired for various workpiece positioning, orientation, etc. However, the surfaces 107A/B and ports 109A/B should have sufficient symmetry to ensure that the assembly 110 can properly be moved and to ensure that the ports 109A/B be properly positioned in fluid engagement with the manifold 104 when the respective zone is in position to be worked on by the robot 105, etc.

Thus, due to the novel features of exemplary embodiments of the present invention, as described above, a user can achieve the advantages of a movable work surface, while at the same time having effective and efficient work zone ventilation without requiring multiple ventilation systems, or without requiring larger overhead ventilation systems.

It should be noted that the exemplary embodiment depicted in the figures is intended to be exemplary, and other embodiments are contemplated without departing from the spirit or scope of the invention. For example, it is contemplated that embodiments can have more than two work zones as shown in the figures. For example, the assembly can have three or four work zones, where the assembly 110 is again essentially symmetrical. For example, it may be desirable for a workpiece to have additional cool down time after a welding or cutting operation. With three or four (or more) work zones, a workpiece will have an intermittent stop between its welding or cutting operation, and being removed by the user. This allows for additional workpiece cooling, and can also increase workpiece productivity. In each of these embodiments the assembly 110 should be symmetrical such that the geometry of each of the respective work zones (regardless of the number) have substantially the same geometry. For example, if there are three zones each occupies approximately 33.3% of the work surface of the assembly 110, and if there are four each occupies approximately 25%. Of course, in some embodiments, it may be desirable to have asymmetric work zones which do not have the same work zone area. However, in such embodiments, the ports 109A/B should be consistently placed so that regardless of which work zone is positioned in the work area (e.g., at the robot 105) the ports are properly aligned with the manifold 104 so that proper ventilation can be achieved.

Further, although the discussion herein is primarily directed to an assembly 110 which is rotated to present the work zones to the robot 105, other embodiments are not limited in this way. Specifically, embodiments of the present invention can also use other types of movement to position a work zone—and thus a ventilation port, to the desired work station area. For example, in other exemplary embodiments, a conveyor system can be used where each work surface on the conveyor has a ventilation port positioned in a consistent position such that when each conveyor zone is positioned in front of the robot the ventilation port and the manifold for the ventilation system will be aligned and in fluid engagement with each other. Thus, embodiments of the present invention are not limited to rotational movement only.

It should also be noted that embodiments of the present invention can be used in robotic, semi-automatic welding cells and can have wall structures (not shown) placed around them for added protection.

In the exemplary embodiment shown in FIGS. 1-4, the work surface is divided into individual work surfaces 107A, 107B by the center divider 106. However, in other embodiments, a plurality of work surfaces (or work zones) may be provided without the need of a divider. For example, for a fully enclosed robotic welding system, a divider may not be required or needed to provide a plurality of work surfaces (or work zones).

Figure 3:
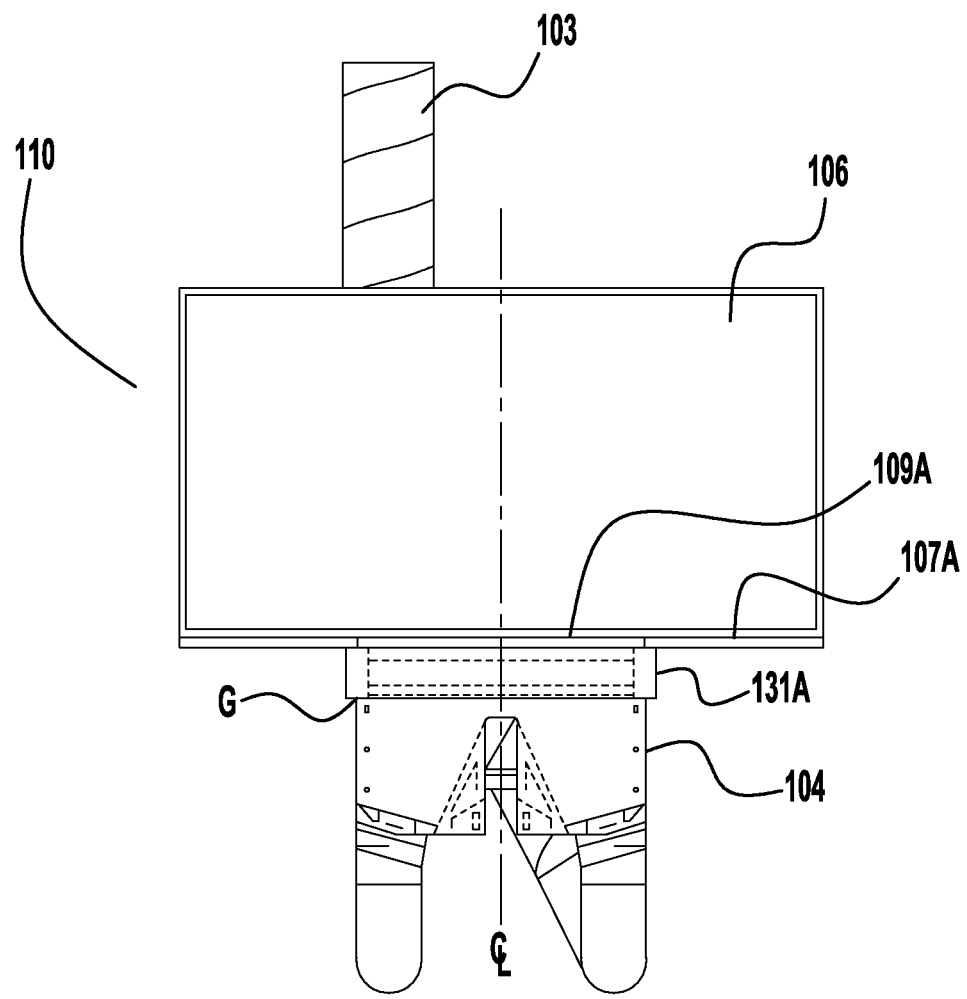
FIG. 3 illustrates an additional view of the embodiment shown in FIG. 1.

As explained above, the assembly 110 is constructed such that each of the ports 109A/B is positionable in fluid engagement with a single stationary manifold 104 which allows for repeated movement of the assembly 110, but allows for adequate ventilation for each work zone of the assembly 110. However, the assembly 110 is to also be freely movable so as to minimize the need for user interaction for the assembly 110 to move to its respective positions. Thus, in exemplary embodiments of the present invention, a gap G (FIG. 3) exists between a bottom edge of the ports 109A/B and the top edge of the manifold 104. The gap G is typically large enough to allow for free movement of the assembly 110 but also small enough to ensure sufficient ventilation through the ports 109A/B. If the gap G is too large too much air flow can be drawn through the gap, as opposed to the ports 109A/B, thus diminishing effective ventilation. In exemplary embodiments of the present invention, the maximum distance for the gap G around the perimeter of the manifold 104 is in the range of 0.1 to 0.5 inch. In other exemplary embodiments, the maximum distance of the gap is in the range of 0.1875 to 0.25 inch. As shown in FIGS. 3 and 5B, a port extension portion 131A/131B can be attached to the assembly which extends below (or away from) the work surfaces 107A/B and aids in providing the desired fluid engagement between the ports 109A/B and the manifold 104.

However, in some embodiments, the gap G described above may not exist between a bottom edge of the ports 109A/B and the top edge of the manifold 104. For example, a constant contact sliding joint (not shown) may be utilized without the need of the gap G. For specific example, the lower side of the extension portion 131A/B includes a wide flat surface and the manifold 104 also includes a wide flat flange such that the two opposing surfaces are approximately parallel to and in contact with each other. When properly lubricated, this contact sliding joint configuration requires no physical gap at the interface, thus promoting optimal or maximum suction at the ventilation port opening. In other examples, the size and shape of the sliding contact joint may vary without departing from the scope of the invention, including concentric and tangential sliding contact joint configurations.

Figure 5A:
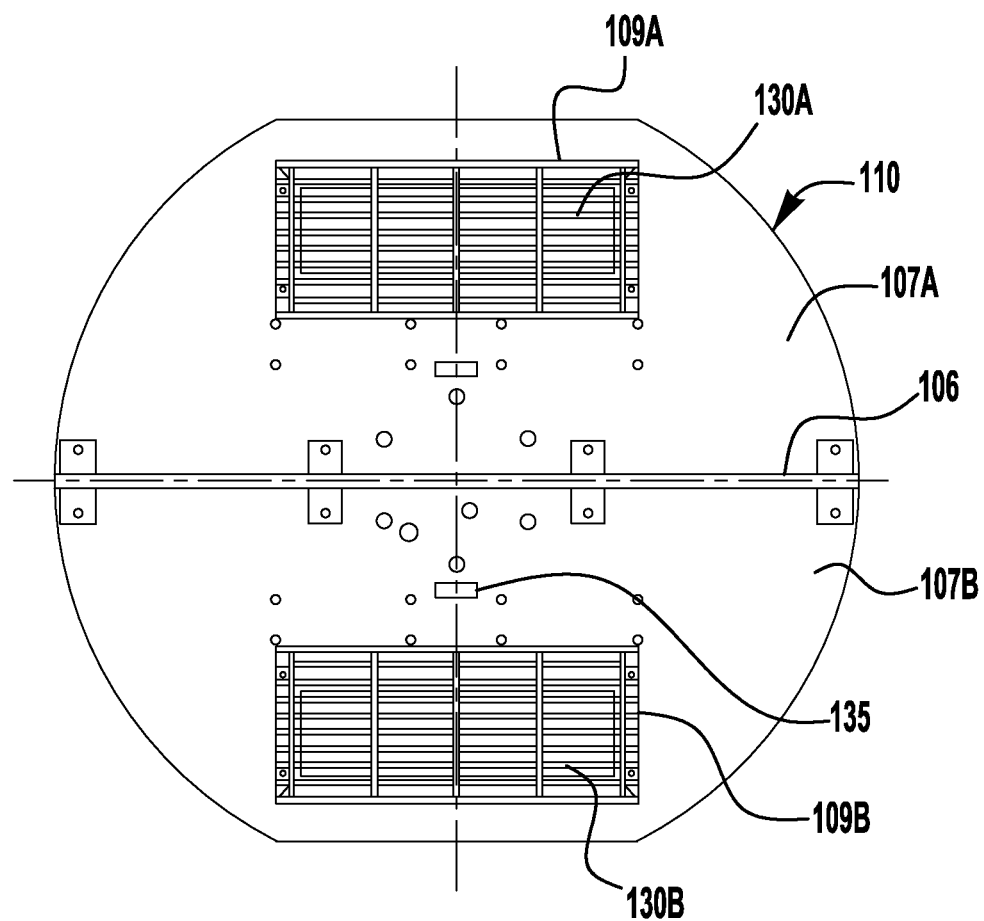
FIGS. 5A and 5B illustrate exemplary embodiments of a workpiece surface utilized in exemplary embodiments of the present invention.
Figure 5B:
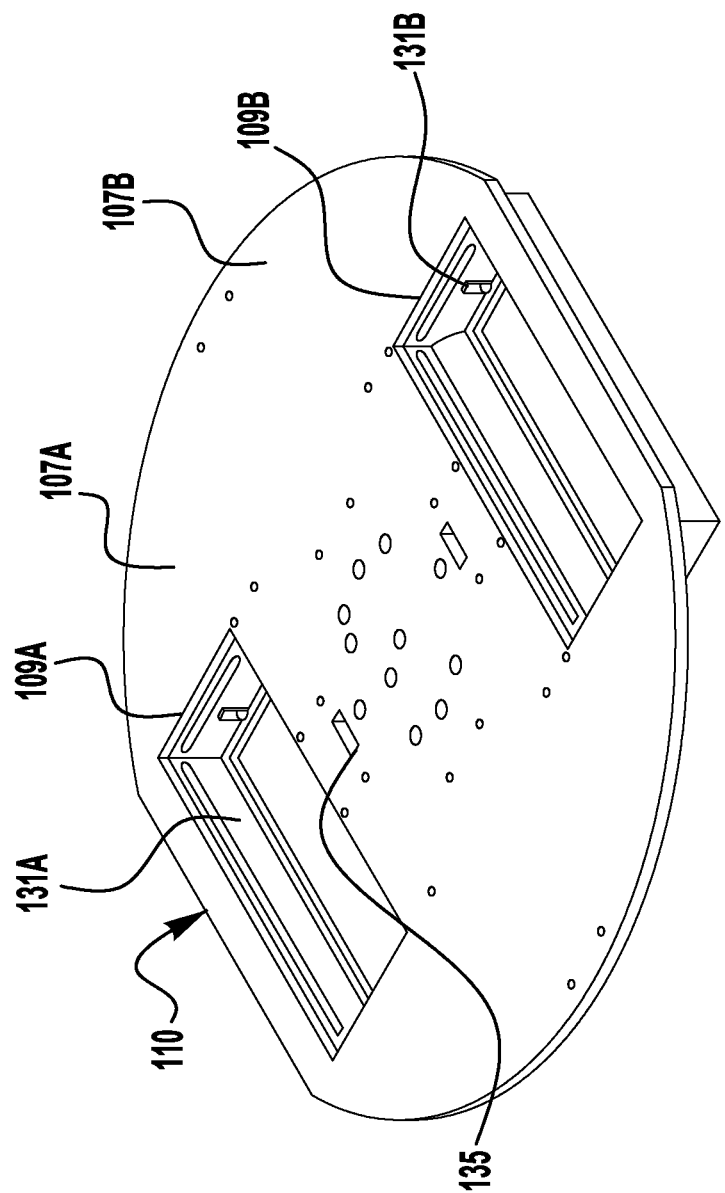

FIG. 5A depicts an exemplary embodiment of the assembly 110 having two work zones with surfaces 107A/B and two ports 109A/B as described above. As shown, each port 109A/B also utilizes a support vent structure 130A/B, respectively. The support vent structure 130A/B is a rigid structure that sits flush with the surfaces 107A/B, respectively, not only to support a workpiece but also to allow for downward ventilation when the ports 109A/B are positioned over the manifold 104. The support vent structure 130A/B can be constructed from any known material and configuration to ensure proper workpiece placement and adequate ventilation. The support vent structure 130A/B may be a grate-like structure as shown in FIG. 5A such that undesirable foreign items are prevented from entering into the ventilation system 100. In some exemplary embodiments, the support vent structures 130A/B may not be fixedly secured to the assembly 110 (such as with fasteners, etc.) but can merely be a "drop in" or "clip in" type. In such embodiments, the support vent structure 130A/B can be easily replaced or changed out as needed, as it may be desirable to change support vent structure depending on the workpieces. FIG. 5B depicts the work zones, surfaces 107A/B, ports 109A/B and extensions 131A/B of the assembly 110 without the divider 106 and support vent structures 130A/B. Also shown are exemplary workpiece holes or guides 135 that were described earlier.

In addition to the guides 135, etc. on the surfaces 107A/B, other exemplary embodiments can use contact switches or contact sensors on the surfaces 107A/B to indicate when a workpiece is properly positioned on the surfaces 107A/B to control movement of the assembly 110. As described previously, in some embodiments a user can indicate to the controller 115 when movement of the assembly 110 is desired. In such embodiments, the user would indicate that a workpiece has been properly placed on a surface 107A/B thus indicating that the user is ready for movement of the assembly 110. In exemplary embodiments, the controller 115 would then wait until the robot 105 completes its operation before moving the assembly 110. This prevents premature movement of the assembly 110. Thus, the controller 115 waits for at least two events—welding/cutting completion and workpiece installation—before moving the assembly 110. The signal indicating completion of welding/cutting can also come from a user in a manual or semi-automatic welding operation. However, in other exemplary embodiments, contact switches, pressure switches, sensors, etc. can be positioned on each of the surfaces 107A/107B that engage with a workpiece when the workpiece is properly positioned. Thus, when a workpiece is properly positioned the appropriate sensors/switches are engaged and a signal is provided to the controller 115 to indicate that the workpiece is positioned properly, and the controller 115 does not move the assembly 110 until the appropriate sensors/switches are engaged. In some embodiments, a plurality of contact switches can be used in specific locations such that the controller 115 will not allow movement until each contact switch is all engaged. In other embodiments, at least one pressure switch can be utilized which senses an amount of pressure or weight and the controller 115 will allow to move the assembly 110 only when the appropriate amount of weight/pressure is detected. Various other sensor/switch configurations can be used without departing from the spirit or scope of the present invention. In other exemplary embodiments, non-contact switches and/or sensors can be used. For example, optical and/or magnetic sensors can be used to sense the positioning and placement of the workpieces to control the movement of the assembly 110, by the controller 115, as described above. Further, in other exemplary embodiments, at least two contact points can be utilized such that when a workpiece is positioned properly the workpiece completes an electrical circuit for a sensing current that is passed through the workpiece, thus indicating to the controller that the workpiece is in place properly. In such embodiments, the sensing current is turned off prior to the welding or cutting operation.

In other exemplary embodiments, a plurality of sensors/switches (contact or non-contact) can be placed on each surface 107A/B to allow for the placement and sensing of different workpieces, having different configurations. That is, a first switch/sensor (or group of switches/sensors which can be contact or non-contact) can be used to sense a first type of workpiece having a first set of characteristics (shape, size, etc.) such that when the first switch/sensor(s) are engaged the controller 115 recognizes that a first workpiece is placed on a surface 107A/B. Thus, the controller 115 provides the proper instructions to the robot 105 for the first workpiece. The surfaces 107A/B also have a second switch/sensor (or group of sensors/switches which can be contact or non-contact) which, when engaged, indicate that a second workpiece which is different than the first workpiece is placed on a surface 107A/B. Thus, the controller 115 then recognizes that the second type of workpiece has been placed on the surface 107A/B and instructs the robot 105 accordingly. Such embodiments can increase the flexibility of the system 100, by allowing for the system 100 to be used on multiple types of workpieces having different characteristics, while minimizing the chance for errors or requiring user input for each different workpiece. For example, some exemplary embodiments can use pressure switches which sense the amount of pressure or weight being applied and inform the controller 115 of the sensed pressure/weight to determine which workpiece has been installed. Other embodiments can use switches/sensors (contact or non-contact) placed at preselected locations on the surfaces 107A/B (as described above) and the combination of switches/sensors being engaged informs the controller 115 which workpiece or type of workpiece has been placed on the surface 107A/B. Other embodiments, which use a sensing current to determine the presence of a workpiece, can use the detected resistance of the workpiece to determine which type of workpiece is placed in the work zone.

It should also be noted that the depiction of the manifold 104, duct system 103 and fume extraction device 101 in the figures are intended to be exemplary, as various other configurations can be utilized without departing from the spirit or scope of the present invention. For example, as shown in FIG. 1 the fume extraction device 101 is positioned remotely from the assembly 110 and can be positioned outside of any protective barrier (not shown) used to protect the work area around the assembly 101. However, in other exemplary embodiments the device 101 and duct system 103 can be formed as an integral unit within a single housing which houses the motor 108, manifold 104, etc. That is, in some embodiments, a single housing can be positioned below the assembly 110 which houses the device 101, duct system 103, manifold 104, motor 108, and a controller 115 to make a single compact integral unit.

Figure 6B:
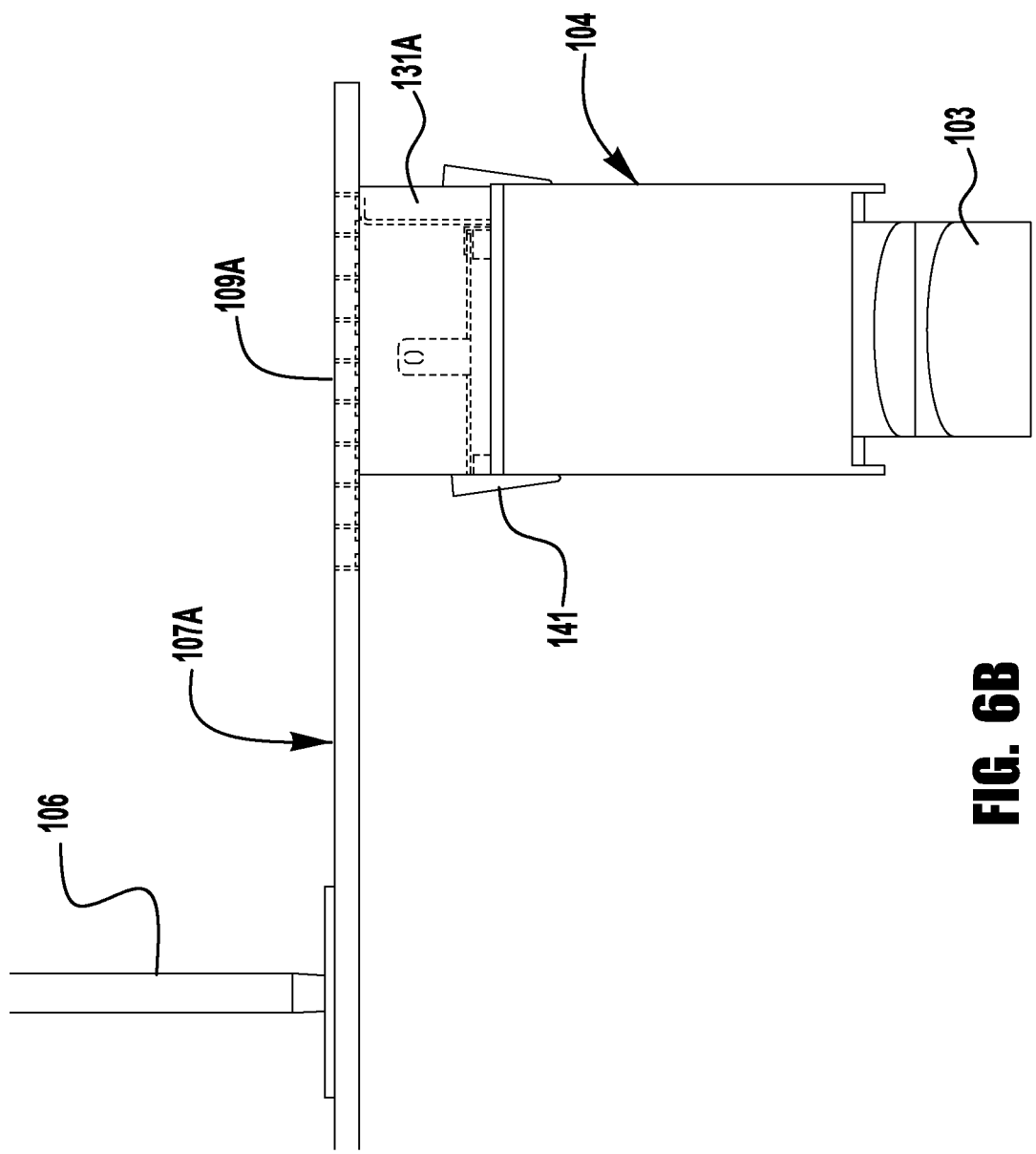

As described above, in some embodiments a gap G can exist between the stationary manifold 104 and the ports 109A/B or extensions 131A/B to allow for easy movement of the assembly 110 while still allowing for adequate ventilation. FIGS. 6A through 6C depict other exemplary embodiments in which a sealing engagement exists between the assembly 110 and the manifold 104. In FIGS. 6A and 6B a flexible seal 140/141 is secured to the extension 131A which provides a sealed engagement between the manifold 104 and the extensions 131A/B when positioned appropriately as described above. These flexible seals can be made from any flexible material, such as rubber or neoprene, etc. that will allow for movement of the assembly 110 while also provide a sealed engagement to further enhance ventilation. FIG. 6A depicts a rounded seal 140, while FIG. 6B depicts a blade type seal 141. While the seals are shown to be secured to the extensions 131A/B in FIGS. 6A and 6B, they can be secured to the manifold 104, if desired. During operation, when the assembly 110 is properly positioned, after movement, the seal 140/141 covers at least the majority of the gap G to enhance air flow through the ports 109A/B. In some embodiments, the seal 140/141 is in a compressed or deflected state when the assembly 110 is properly positioned to enhance the sealing of the gap G. FIG. 6C depicts another exemplary embodiment where the gap G is bridged by bristles 143 secured with a bristle engagement 142 to either the extension 131A/B or the manifold 104. However, in other embodiments, the bristles 143 may be attached to other nearby structure, e.g. work surfaces 107A/B. The bristles 143 can be made of any flexible material which enhances air flow through the ports 109A/B and provides flexibility to allow the assembly 110 to move as desired. It is noted that embodiments of the present invention do not require the sealing mechanism 140/141/143 to provide an "air tight" seal, but that they aid preventing excessive air flow through the gap G so as to enhance the downdraft ventilation through the ports. In some embodiments, the bristles themselves may serve as the extension 131A/B, i.e. no separate extension 131A/B needed. In this case, the bristles may be longer than the ones shown in FIG. 6C.

In other exemplary embodiments, a plurality of movable flaps or other components can be placed on either the extensions 131A/B or the manifold 104 which can be actuated/moved to be retracted when the assembly 110 is to be moved, and then moved to cover the gap G when the assembly 110 is moved to a work position. Such an embodiment can aid in making a tighter closing of the gap G to optimize air flow. In other exemplary embodiments, the duct system 103 has a flexible portion to allow the manifold 104 to be moved upward and downward by an actuator, where the actuator moves the manifold 104 up to engage the extensions 131A/B or ports 109A/B when the assembly 110 is moved into its working position, and then the manifold 104 is retracted before the assembly 110 is moved after work completion. In such embodiments, the movement/actuation of the flaps and/or manifold 104 can be controlled by the controller 115.

In further exemplary embodiments, a damper (or dampers) can be installed in the manifold 104 and/or the duct system 103 to control or regulate the ventilation flow. For example, the damper(s) can be used to ensure evenly distributed flow rates over the area of the ports 109A/B. Further, the damper(s) can be controlled either manually or by the controller to control ventilation based on the workpiece. For example, it may be desirable to focus the downdraft ventilation to one region of the port 109A/B depending on the workpiece and as such the damper(s) can be used to control the ventilation flow accordingly. In some exemplary embodiments the damper(s) can be positioned in the manifold 104, while in others the damper(s) can be positioned in the duct system 103, for example, just below the manifold 104.

In the exemplary embodiments described above, the ventilation ports 109A/B are positioned in each respective surface 107A/B. However, in other embodiments, one or more ventilation ports may be provided in one or more dividers (e.g. center divider 106) in addition to the ventilation ports 109A/B. In this way, not only downdraft ventilation via the ventilation ports 109A/B, but also backward draft ventilation via the ventilation port(s) positioned in the divider(s) can be achieved, thereby increasing source capture capacity. In this case, a divider whose width is broader than that of the center divider 106 shown in FIG. 1 may be used to include a ventilation port(s) therein. Further, in some embodiments, only backward draft ventilation (or to-side ventilation) may be used without downdraft ventilation.

In the embodiments utilizing backward draft (or to-side) ventilation, the ventilation port in a divider may utilize a support vent structure similar to the support vent structure 130A/B described above. Thus, this support structure may be a rigid structure that sits planar with or is incorporated into the divider wall surface. This support vent structure may be a grate-like structure such that undesirable foreign items are prevented from entering into the ventilation system 100.

In some embodiments, a replaceable pre-filter or spark arrestor (e.g. metallic assembly) may be provided, e.g. beneath or behind the surface of the ventilation port and support vent structure. The replaceable pre-filter or spark arrestor can help prevent smaller, foreign or undesirable items from entering into the ventilation system that would have otherwise been able to pass through a coarse grate (i.e. support vent structure). In some specific cases, the pre-filter and spark arrestor may be integrated into a singular component that serves both functions concurrently. For welding applications that emit sparks, molten weld spatter, embers, or fragments of weld slag, the spark arrestor can help prevent these hot items from being carried back to the ventilation system filter element.

While the described subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed:

1. A workpiece positioning system integrated with a fume extraction device comprising a filter, the system comprising:
   a rotatably movable work surface assembly having first and second work zones, the work surface assembly including
      first and second work surfaces configured for holding respective workpieces,
      a divider dividing the first work surface from the second work surface and into individual work surfaces for each of the first and second work zones;
      a first ventilation port covered by a first grate in the first work surface;
      a second ventilation port covered by a second grate in the second work surface;
      a first extension portion that extends downward below the first ventilation port; and
      a second extension portion that extends downward below the second ventilation port;
   a stationary downdraft ventilation manifold disposed beneath the work surface assembly and coupled to the fume extraction device through a duct system, wherein the manifold is attached to the duct system through a plurality of outlets in the manifold;
   a motor that rotatably moves the work surface assembly; and
   a controller to generate command signals to control movement of the motor and the work surface assembly between a first position in which the first ventilation port is vertically aligned with the manifold and fluidly coupled to the manifold by the first extension portion, and a second position in which the second ventilation port is vertically aligned with the manifold and fluidly coupled to the manifold by the second extension portion.

2. The system of claim 1, wherein when the manifold is, aligned with the first ventilation port, a geometric center of the manifold is aligned with a geometric center of the first ventilation port.

3. The system of claim 1, wherein a size and shape of the first ventilation port and the second ventilation port are substantially similar to a size and shape of an upper opening of the manifold.

4. The system of claim 1, wherein each of the first and second work surfaces includes a guide on each work surface to allow a workpiece to be placed consistently in an identical position and orientation.

5. The system of claim 1, wherein the first and second work surfaces are substantially symmetrical on opposite sides of the divider.

6. The system of claim 1, wherein when the manifold aligned with the first ventilation port, a gap exists between a top edge of the manifold and a bottom edge of the first ventilation port.

7. The system of claim 6, wherein the gap ranges from 0.1 to 0.5 inch.

8. The system of claim 1, wherein the first grate and the second grate respectively sit flush with the first work surface and the second work surface.

9. The system of claim 1, wherein the first extension portion includes a seal attached to the first extension portion to provide sealing between the first extension portion and the manifold during ventilation operation.

10. The system of claim 1, wherein bristles are attached to either the first extension portion or the manifold to provide sealing between the first extension portion and the manifold during ventilation operation.

11. The system of claim 1, wherein the first extension portion and the manifold include opposite facing, complimentarily shaped surfaces that are positioned in sliding contact with each other.

12. The system of claim 1, wherein the system further comprises at least one damper in at least one of the manifold and duct system to control ventilation flow.

13. A workpiece positioning system integrated with a fume extraction device comprising a filter, the system comprising:
   a rotatable work surface assembly having first and second work zones, the work surface assembly including
      first and second work surfaces configured for holding respective workpieces;
      a first ventilation port covered by a first grate in the first work surface;
      a second ventilation port covered by a second grate in the second work surface;
      a first extension portion that extends downward below the first ventilation port; and
      a second extension portion that extends downward below the second ventilation port;
   a downdraft ventilation manifold disposed beneath the work surface assembly and coupled to the fume extraction device through a duct system,
   wherein the work surface assembly is configured to rotate above the manifold between a first position in which the first ventilation port is vertically aligned with the manifold and fluidly coupled to the manifold by the first extension portion, and a second position in which the second ventilation port is vertically aligned with the manifold and fluidly coupled to the manifold by the second extension portion
   wherein the manifold is configured to be movable upward or downward below the rotatable work surface assembly to engage with the first or second extension portion.

14. The system of claim 13, wherein the work surface assembly includes a divider dividing the first work surface from the second work surface and into individual work surfaces for each of the first and second work zones.

* * * * *